United States Patent
Kaiser et al.

(10) Patent No.: US 7,425,521 B2
(45) Date of Patent: Sep. 16, 2008

(54) STRUCTURED ADSORBENT MEDIA FOR PURIFYING CONTAMINATED AIR

(75) Inventors: Mark Kaiser, Arlington Heights, IL (US); Peter M. Michalakos, Chicago, IL (US); Gary Seminara, Wonder Lake, IL (US); John R. Regalbuto, Glenview, IL (US)

(73) Assignee: Honeywell International Inc., Morristown, NJ (US)

( * ) Notice: Subject to any disclaimer, the term of this patent is extended or adjusted under 35 U.S.C. 154(b) by 876 days.

(21) Appl. No.: 10/870,566

(22) Filed: Jun. 16, 2004

(65) Prior Publication Data

US 2004/0259729 A1   Dec. 23, 2004

Related U.S. Application Data

(60) Provisional application No. 60/480,380, filed on Jun. 20, 2003.

(51) Int. Cl.
  *C01B 31/08* (2006.01)
(52) U.S. Cl. .................. 502/401; 502/417; 423/460
(58) Field of Classification Search ............. 423/460; 502/401, 417, 418, 423, 424
  See application file for complete search history.

(56) References Cited

U.S. PATENT DOCUMENTS

| | | | |
|---|---|---|---|
| 2,920,050 A | | 1/1960 | Blacet et al. |
| 2,920,051 A | | 1/1960 | Wiig et al. |
| 3,355,317 A | | 11/1967 | Keith, II et al. |
| 3,609,099 A | * | 9/1971 | Mickelson ................ 502/314 |
| 3,721,072 A | | 3/1973 | Clapham |
| 4,531,953 A | | 7/1985 | Groose et al. |
| 4,801,311 A | * | 1/1989 | Tolles ........................ 95/128 |
| 4,802,898 A | * | 2/1989 | Tolles ........................ 95/132 |
| 4,820,318 A | | 4/1989 | Chang et al. |
| 5,033,465 A | | 7/1991 | Braun et al. |
| 5,063,196 A | * | 11/1991 | Doughty et al. ......... 423/240 R |
| 5,192,735 A | | 3/1993 | Pagotto et al. |
| 5,292,707 A | | 3/1994 | Aparicio et al. |
| 5,482,915 A | | 1/1996 | Golden et al. |
| 5,488,023 A | * | 1/1996 | Gadkaree et al. ............ 502/182 |
| 5,492,882 A | * | 2/1996 | Doughty et al. ............ 502/417 |
| 5,540,759 A | | 7/1996 | Golden et al. |
| 5,792,720 A | | 8/1998 | Ro et al. |
| 5,827,355 A | | 10/1998 | Wilson et al. |
| 5,998,328 A | | 12/1999 | Dawes et al. |
| 6,156,697 A | | 12/2000 | Gadkaree |
| 6,284,705 B1 | | 9/2001 | Park et al. |
| 6,340,024 B1 | | 1/2002 | Brookman et al. |

(Continued)

OTHER PUBLICATIONS

U.S. Army; Detail Specification Carbon, Activated, Impregnated, Copper-Silver-Zinc-Molybdenum- Triethylenediamine (ASZM-TEDA); MIL-DTL-32101; Sep. 19, 2002.

*Primary Examiner*—Stuart L. Hendrickson
*Assistant Examiner*—Daniel C. McCracken
(74) *Attorney, Agent, or Firm*—Oral Caglar, Esq.

(57) ABSTRACT

A method for purifying breathing air using a carbon-based monolith structure impregnated with copper, silver, zinc, and molybdenum species and triethylenediamine, wherein the monolith structure is impregnated by a multiple step process. The method of impregnation results in a carbon-based monolith structure that purifies nuclear, biological, or chemical contaminants under conditions of high flow rate and low pressure drop.

33 Claims, 3 Drawing Sheets

U.S. PATENT DOCUMENTS 6,344,071 B1 * 2/2002 Smith et al. .................. 95/274
6,485,546 B2 11/2002 Fuchs
6,699,561 B2 3/2004 Wolff

* cited by examiner

US 7,425,521 B2

STRUCTURED ADSORBENT MEDIA FOR PURIFYING CONTAMINATED AIR

CROSS-REFERENCE TO RELATED APPLICATIONS

This application claims the benefit of U.S. Provisional Patent Application No. 60/480,380, filed on Jun. 20, 2003.

BACKGROUND OF THE INVENTION

This invention relates generally to a method and apparatus for purifying breathing air, and in particular, to an activated carbon monolith structure impregnated with copper, silver, zinc, and molybdenum or the oxides, salts, or complexes thereof, which may be thermally treated, and triethylenediamine.

Filters for purifying breathing air contaminated with toxic or odorous compounds are generally comprised of beds packed with carbon particles. Activated carbon monoliths can be made by forming a structure from a precursor resin, carbonizing, and activating the structure. Such a structure is structurally superior to packed beds made from particulate activated carbon. One disadvantage of typical particulate activated carbon is particle attrition due to particle contact in packed beds, which leads to potential dusting.

Another disadvantage of typical activated carbon packed beds used for filtration is that the pressure drop across these activated carbon beds is too high. Due to the high flow rates used in military applications, such as nuclear, biological, chemical (NBC) filters, a low pressure drop is desirable.

At high flow rates, the increased pressure drop across filters becomes unsatisfactory because the energy required to move the contaminated air stream increases. To mitigate this pressure drop would require a larger bed cross-section or larger particles, both of which reduce the filter efficiency on a weight basis. Furthermore, it is important to realize that because some applications are already limited by the mass transfer efficiency (diffusion) of the toxic compounds to the carbon surface, rather than by the theoretical sorption capacity of the bed, the geometry and adsorption kinetics are of increased importance.

Filtration performance may be enhanced when performed at high temperature. However, the typical activated carbon is susceptible to heat damage at high temperatures. For example, the carbon may burn if the air to be processed is too hot, or if the heat of adsorption or the heat of reaction is too great. Further, typical activated carbon cannot be processed at high temperatures for example, after impregnation, it may not be desirable to heat activated carbon in order to decompose the impregnated species to increase the effective surface area or create a more active species. Therefore, a heat-resistant carbon-based filter would have increased purification performance with a greater degree of safety of operation.

U.S. Pat. No. 4,820,318 to Chang, et al. describes the removal of organic compounds from gas streams using carbon molecular sieves as an adsorbent material. However, the Chang reference does not describe using metal species on an adsorbent material surface for selective removal of compounds from contaminated air.

U.S. Pat. No. 5,063,196 to Doughty, et al. describes an activated carbon adsorbent that is impregnated by what is known in the art as "incipient wetness" or "dry impregnation." In the incipient wetness method, the metal salts may be dissolved in just the amount of solution required to fill the pore volume of the activated carbon adsorbent. It is known in the prior art (Park and Regalbuto, J. *Colloid and Interface Science* 175, 1995, 239) that when the carbon and solution are contacted, the pH of the resulting thick slurry will approach the point of zero charge ("PZC") of the carbon and the interaction of the metal ions with the carbon surface will be weak. The PZC is the pH at which a substrate surface is neutrally charged. At this pH the majority of the —OH groups are neither protonated, which would give rise to a positively charged surface (—$OH_2^+$), or deprotonated, which would give rise to a negatively charged surface (—$O^-$). Thus, one cannot control the agglomeration of metals on the surface, as the metals are randomly deposited when the solvent disappears. This means that a large amount of metal remains behind in solution (and later removed as waste) instead of being adsorbed to the surface.

As can be seen, there is a need for an improved apparatus and method for purifying breathing air with high flow rates and low pressure drops. There is also a need for controlling the agglomeration of metals on a surface so that most of the metal is adsorbed to a surface instead of causing excess waste and expense. Furthermore, there is a need for an apparatus and method for NBC applications.

SUMMARY OF THE INVENTION

In one aspect of the present invention, a carbon-based adsorbent material (for example, a carbon molecular sieve material or a carbon-based monolith structure) is impregnated by a method of wet impregnation with at least one metal species.

In another aspect of the present invention, a carbon-based monolith structure impregnated with at least one solution so as to provide a composition, expressed as total elemental weight, comprises from about 5.51% to about 8% copper, from about 4.51% to about 8% zinc, from about 0.03% to about 0.1% silver, from about 2.00% to about 3.00% molybdenum, and from about 2.00% to about 3.99% triethylenediamene.

In still another aspect of the present invention, a carbon-based monolith structure impregnated so as to provide a composition, expressed as total elemental weight comprises from about 5.51% to about 8% copper, from about 4.51% to about 8% zinc, from about 0.03% to about 0.1% silver, from about 2.00% to about 3.00% molybdenum, and from about 2.00% to about 3.99% triethylenediamene; the carbon-based monolith structure comprising pores, wherein the carbon-based monolith structure has a carbon surface area of from about 500 $m^2/g$ to about 2000 $m^2/g$; and wherein the pores in the carbon-based monolith structure, once impregnated, have sizes in the range of from about six to about thirty Angstroms.

In yet another aspect of the present invention, a method (for example, a method of wet impregnation such as strong electrostatic adsorption "SEA"), for making a carbon-based monolith structure impregnated with copper, silver, zinc, and molybdenum species and triethylenediamine, wherein the monolith structure is impregnated by contacting the monolith structure with a first solution; adjusting the pH of the first solution to about 2 to 5 (or adjusting the pH of the first solution to 2-3 units below the pH of PZC for the uptake of anionic metal complexes such as molybdates, $(MoO_4)^{-2}$); treating thermally the monolith structure within a temperature range of from about 280 degrees C. to about 400 degrees C.; contacting the monolith structure with a second solution; adjusting the pH of the second solution to about 8 to 11 (or adjusting the pH of the second solution to 2-3 pH units above the PZC for the uptake of cations such at $Cu^{+2}$); treating thermally the monolith structure within a temperature range of from about 100 degrees C. to about 400 degrees C. (often from about 280 degrees C. to about 400 degrees C.); reducing the monolith structure in hydrogen within a temperature range of from about 250 degrees C. to about 500 degrees C.; and exposing the monolith structure to triethylenediamine vapor within a temperature range of from about 80 degrees C. to about 200 degrees C. Optionally, the monolith structure may be contacted with cationic solutions before anionic solutions. The steps of the method may not necessarily occur in the order recited.

In still yet another aspect of the present invention, a method for making a carbon-based monolith structure impregnated with copper, silver, zinc, and molybdenum species and triethylenediamine, wherein the monolith structure is impregnated by contacting the monolith structure with a first solution; adjusting the pH of the first solution to about 8 to about 11; treating thermally the monolith structure within a temperature range of from about 100 degrees C. to about 400 degrees C.; contacting the monolith structure with a second solution; adjusting the pH of the second solution to about 2 to about 5; treating thermally the monolith structure within a temperature range of from about 280 degrees C. to about 400 degrees C.; reducing the monolith structure in hydrogen within a temperature range of from about 250 degrees C. to about 500 degrees C.; and exposing the monolith structure to triethylenediamine vapor within a temperature range of from about 80 degrees C. to about 200 degrees C.

In yet another aspect of the present invention, an apparatus for purifying breathing air comprises an environmental control system; a carbon-based adsorbent material impregnated with at least one material selected from the group consisting of copper species, silver species, zinc species, molybdenum species, and triethylenediamine; the carbon-based adsorbent material situated within the environmental control system; and an air-conditioning system, situated within the environmental control system; the carbon-based adsorbent material comprising pores wherein the carbon-based adsorbent material has a carbon surface area of from about 500 $m^2/g$ to about 2000 $m^2/g$; and wherein, once impregnated, at least 10% of the pores, in the carbon-based adsorbent material, have sizes, after impregnation, in the range of from about six to about thirty Angstroms.

In still yet another aspect of the present invention, a method for purifying breathing air comprises a) forcing air from the environment into an environmental control system, to produce a forced air; b) filtering the forced air with a carbon-based adsorbent material impregnated with at least one material selected from the group consisting of copper species, silver species, zinc species, molybdenum species, and triethylenediamine, to produce a filtered air; c) forcing the filtered air into an air-conditioning system, to produce a conditioned air; and d) forcing the conditioned air into an interior space. The steps of the method may not necessarily occur in the order recited.

In a still further aspect of the present invention, a method for purifying breathing air comprises a) forcing air from the environment into an environmental control system, to produce a forced air; b) forcing the forced air into an air-conditioning system, to produce a conditioned air; c) filtering the conditioned air with a carbon-based adsorbent material impregnated with at least one material selected from the group consisting of copper species, silver species, zinc species, molybdenum species, and triethylenediamine, to produce a filtered air; and d) forcing the filtered air into an interior space.

These and other aspects, objects, features and advantages of the present invention, are specifically set forth in, or will become apparent from, the following detailed description of a preferred embodiment of the invention when read in conjunction with the accompanying drawings.

DETAILED DESCRIPTION OF THE INVENTION

Figure 1:
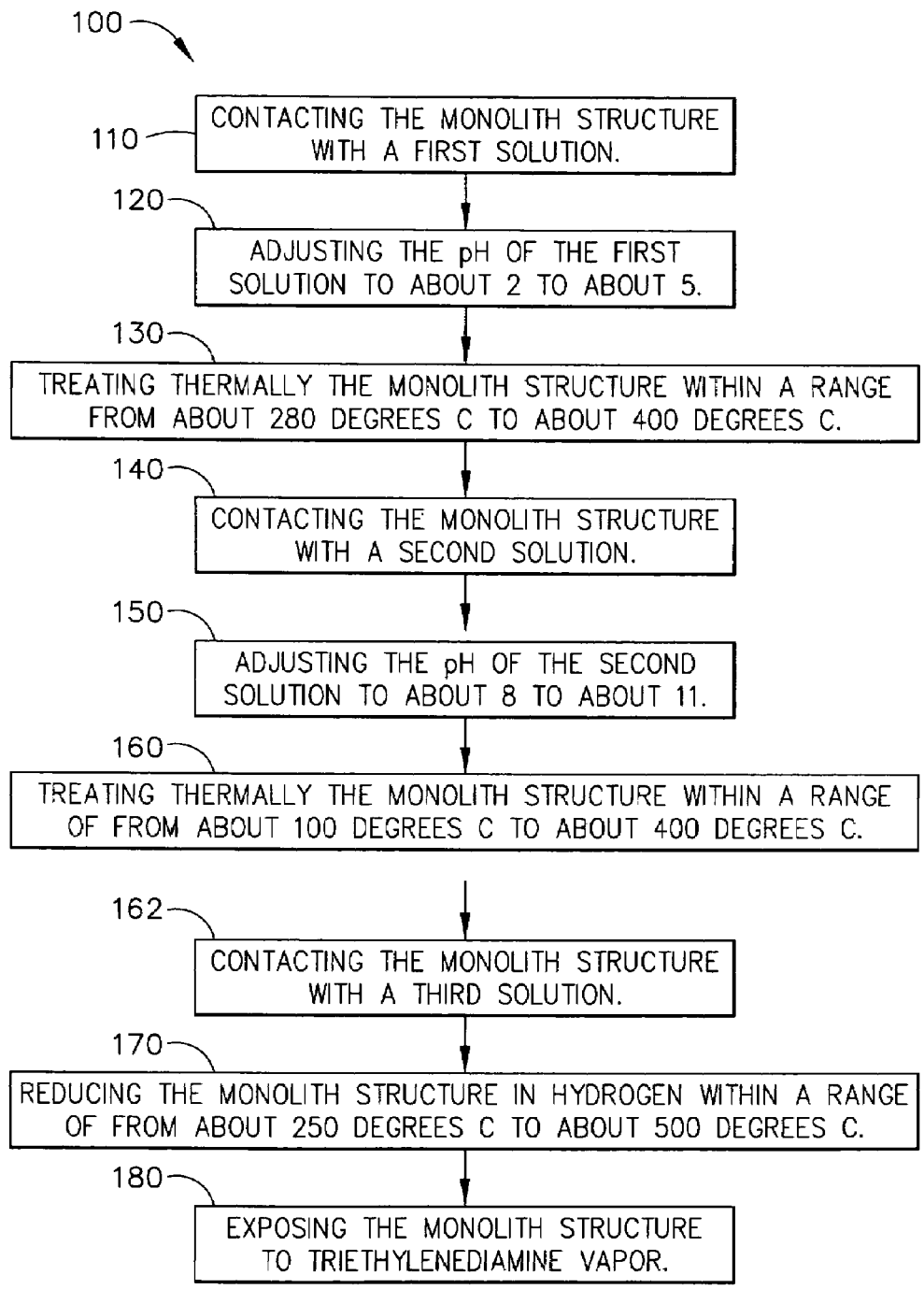
FIG. 1 is a flow chart of a method for making a carbon-based monolith structure impregnated with copper, silver, zinc, and molybdenum species and triethylenediamine, according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides an activated carbon monolith structure, impregnated with metal species, such that high flow rates of contaminated air streams can be decontaminated with low pressure drop. The present invention may be used in military air filters for removing contaminants, for example, nuclear, biological, or chemical contaminants, from breathing air.

Because the present invention decontaminates breathing air, at high flow rates and with low pressure drops, the present invention has several advantages over prior art filters and methods. For example, decontamination efficiency is enhanced by the present invention because of the superior mass transfer of the structured adsorbent using a carbon-based monolith structure compared with a packed bed as used in prior art methods. Therefore, a structured adsorbent filter of the present invention having a given volume has greater capacity and lower pressure drop than a prior art packed bed of equal volume. To remove the same amount of toxic compounds, the volume and pressure drop of the structured adsorbent of the present invention can be less than the volume and pressure drop of a prior art packed bed.

A carbon-based adsorbent material of the present invention may be a carbon-based monolith structure, a carbon molecular sieve ("CMS"), or any other type of carbon-based adsorbent. The carbon-based adsorbent material of the present invention may be in contact with an inorganic material, such as a metal structure or an alumina structure cordierite, which supports the CMS or gives the CMS carbon shape or strength. In a broad sense, the CMS may be in the form of a coating on a support or substrate. The support may comprise materials such as ceramic materials, cardboard, metal, or carbon. Optionally, the carbon-based adsorbent material may be comprised of carbon without a support or substrate.

The carbon-based adsorbent material may be a monolith structure in the form of a multicellular structure, for example, a honeycomb structure as well-known in the art. Honeycomb cell densities, of prior art honeycomb structures; generally range from 235 cells/$cm^2$ (about 1500 cells/$in^2$) to 1 cell/$cm^2$ (about 6 cells/in$^2$), with a desirable cell density of 550 cells/in$^2$. A monolith is a structure that functions as a unitary or single body as opposed to multiple pieces that function in beds, such as granules, pellets, and powders.

This carbon-based adsorbent material of the present invention may be impregnated by the SEA method of wet impregnation. In general, cationic metal precursors may adsorb electrostatically over negatively charged surfaces (for example, surfaces contacted with solutions at pH above the PZC) and anionic metal complexes adsorb similarly over positively charged surfaces (at pHs below the surface PZC). There may be an optimum pH in the upper portion of a lower range at which the electrostatic attraction is strongest. In one aspect of the SEA method, one may determine the PZC of a substrate, find a metal precursor with the appropriate charge, and perform an uptake vs. pH survey to verify the electrostatic mechanism and locate the optimum pH.

Wet impregnation is impregnation that uses an amount of liquid in excess (sometimes in great excess) of the pore volume of the carbon-based adsorbent material. Applying the liquid in excess may impart the ability to easily control the pH of the impregnation solution. By controlling the pH, as in the SEA method, a strong interaction may be effected between a metal precursor and the surface of the carbon-based adsorbent material, so that little, if any, metal remains behind in solution.

This in contrast to the prior art where an activated carbon adsorbent is impregnated by what is known in the art as incipient wetness or dry impregnation. In the incipient wetness method, the metal species are dissolved in just the amount of solution required to fill the pore volume of the activated carbon adsorbent. When the carbon and solution are contacted together, the pH of the resulting thick slurry will approach the PZC of the carbon and the interaction of the metal ions with the carbon surface will be weak. Thus, one cannot control the agglomeration of metals on the surface, as the metals are randomly deposited when the solvent disappears. Wet impregnation, of the present invention may permit controlling the pH and the surface charge and provide a more effective impregnation by using the functional sites of the carbon surface as "anchors" for the metal. This efficient use of surface binding will allow maximum utilization of the metal surfaces present on the adsorbent surface.

The carbon-based adsorbent material may be made by various techniques known in the art. The surface area of the carbon-based adsorbent material may be from about 500 m$^2$/g to about 2000 m$^2$/g, often from about 1000 m$^2$/g to about 1500 m$^2$/g. The pores may have sizes, after impregnation, in the range of about six to about thirty Angstroms. If carbon-based particles are to be used, CMS type adsorbent particles may be used and may have a particle size distribution such that about 100% of the CMS particles pass a 2.36 mm sieve, from about 0% to about 2% of the CMS particles are retained on a 1.70 mm sieve, from about 10% to about 30% of the CMS particles are retained on a 1.18 mm sieve, from about 40% to about 65% of the CMS particles are retained on an 850 mm sieve, from about 10% to about 35% of the CMS particles are retained on a 600 mm sieve, up to about 2.8% of the CMS particles pass a 600 mm sieve, and up to about 0.30% of the CMS particles pass a 212 mm sieve.

Adsorbent materials (activated or not activated; hydrophilic or hydrophobic) suitable for use in the present invention may be made from a variety of precursors including bituminous coal, lignite, peat, synthetic polymers, petroleum pitch, petroleum coke, coal tar pitch, and lignocellulosic materials. Suitable lignocellulosic materials include wood, wood dust, wood flour, sawdust, coconut shell, fruit pits, nut shell, and fruit stones.

A carbon-based monolith structure may be impregnated either prior to application (as when CMS type particulates are added to the surface of a support) or after surface preparation of the carbon monolith, with at least one solution so as to provide a composition of, by total elemental weight including the activated carbon, from about 5.51% to about 8% copper, often from about 6.00% to about 7.00% Cu; from about 4.51% to about 8%, often from about 6.00% to about 7.00% Zn; from about 0.03% to about 0.1% silver; from about 2% to about 3% molybdenum, often from about 2.0% to about 2.5% Mo; and from about 2.00% to about 3.99% triethylenediamine, often from about 2.00% to about 2.5% TEDA. Alternatively, it is possible to alter this formulation so as to tailor the material for specific applications by 1.) using other transition metal species and 2.) creating a carbon surface tailored with inorganic or organic bases.

The carbon-based adsorbent material may be impregnated with a non-aqueous solution, for example, an organic media containing metal species. The carbon surface of the carbon-based adsorbent material may have a PZC of about five to about eight (based on a pH unit) before impregnation.

With reference to FIG. 1, a method 100 for making a carbon-based monolith structure impregnated with copper, silver, zinc, and molybdenum species and triethylenediamine, may comprise a process wherein the monolith structure is impregnated by the following steps. Step 110 may comprise contacting the monolith structure with a first solution. Thereafter, step 120 may comprise adjusting the pH of the first solution to from about 2 to about 5. Next, step 130 may comprise treating thermally the monolith structure with the first solution in air within a temperature range from about 280 degrees C. to about 400 degrees C., often from about 300 degrees C. to about 325 degrees C., or at about 300 degrees C. The first solution may be an ionic solution, for example, an anionic species. A step 140 may comprise contacting the monolith structure with a second solution. Thereafter, step 150 may comprise adjusting the pH of the second solution to from about 8 to about 11. The second solution may be an ionic solution, for example, a cationic species. Treating thermally the monolith structure with the second solution in air at about 100 degrees C. may be performed in a step 160. Next, a step 170 may comprise reducing the monolith structure in hydrogen within a temperature range from about 250 degrees C. to about 500 degrees C., often at a temperature no higher than the temperature used in the thermally treating steps 130 and 160. Thereafter, a step 180 may comprise exposing the monolith structure to triethylenediamine vapor within a temperature range from about 80 degrees C. to about 200 degrees, often from about 80 degrees C. to about 100 degrees C.

The first solution of step 110 may comprise solution of ammonium heptamolybdate at a concentration within a range from about 0.03M to about 0.3 M, often from about 0.05 M to about 0.15 M. The second solution of step 140 may comprise a copper species (such as a copper salt), a silver species (such as a silver salt), or a mixture thereof at a concentration within a range from about 0.25 M to about 1.0 M, often from about 0.45 M to about 0.55 M in copper and about 0.001 M to about 0.01 M, often from about 0.002 M to about 0.005 M in silver. In some embodiments, in a further step 162, the monolith structure may be contacted with a third solution. The third solution may comprise zinc acetate at a concentration within a range from about 0.25 M to about 1.0 M, often from about 0.45 M to about 0.55 M.

The exposing step may be performed for a time within a range from about 1 hour to about 30 hours, often from about 23 hours to about 25 hours. The steps 120 and 150 of adjusting the pH may each be followed by a step (not shown) of removing the monolith structure from the first and second solutions, respectively. The treating thermally steps 130 and 160 may be performed within a nitrogen atmosphere.

The method may be preceded by exposing the monolith structure to concentrated nitric acid, carbon dioxide, steam, other oxidizers, or mixtures thereof. The other oxidizers may comprise substances that are capable of oxidizing another substance and require temperatures adequate for producing the desired oxidation of the surface, such as from about 600 degrees C. to about 1000 degrees C. (at atmospheric pressure).

Figure 2:
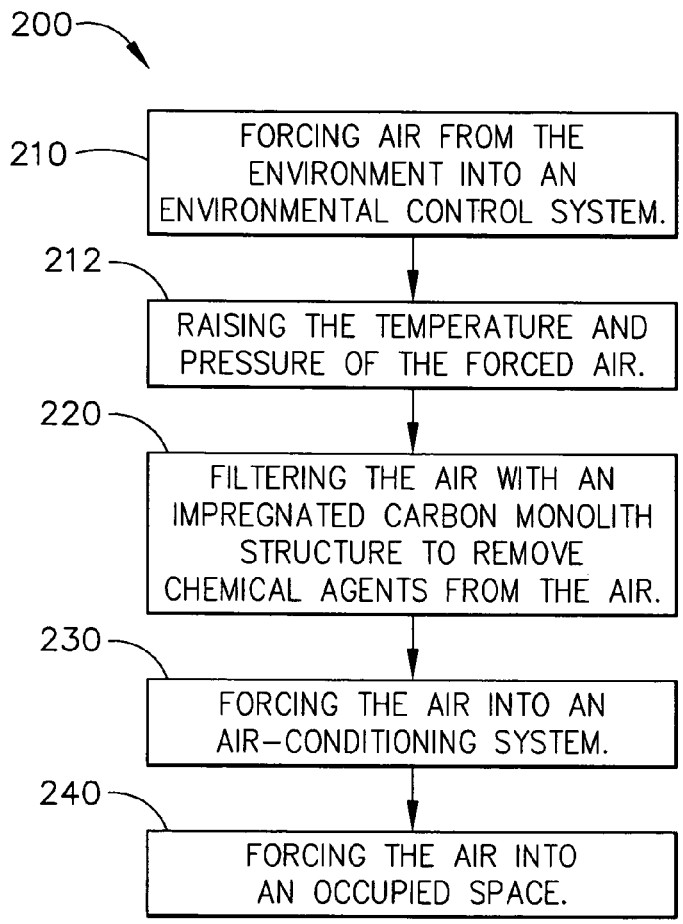
FIG. 2 is a flow chart of a method of purifying breathing air using a carbon-based monolith structure, according to another embodiment of the present invention.

With reference to FIG. 2, a method 200 for purifying breathing air may comprise a step 210 of forcing air from the environment into an environmental control system to produce a forced air. Step 210 may be followed by a step 212 of raising the temperature and pressure of the forced air. Thereafter, a step 220 may comprise filtering the forced air with a carbon-based monolith structure impregnated with at least one material selected from the group consisting of copper species, silver species, zinc species, and molybdenum species and triethylenediamine, to produce a filtered air. A purified air may be conditioned for temperature, pressure, and humidity by performing a step 230 of forcing air the filtered air into an air-conditioning system, to produce a conditioned air. Next, a step 240 may comprise forcing the conditioned air, now purified and conditioned, into a space. The space may be an interior space, for example, a vehicle interior (such as an aircraft cabin, a military tank interior, and the like) or inside a structure (such as a building or underground bunker).

Figure 3:
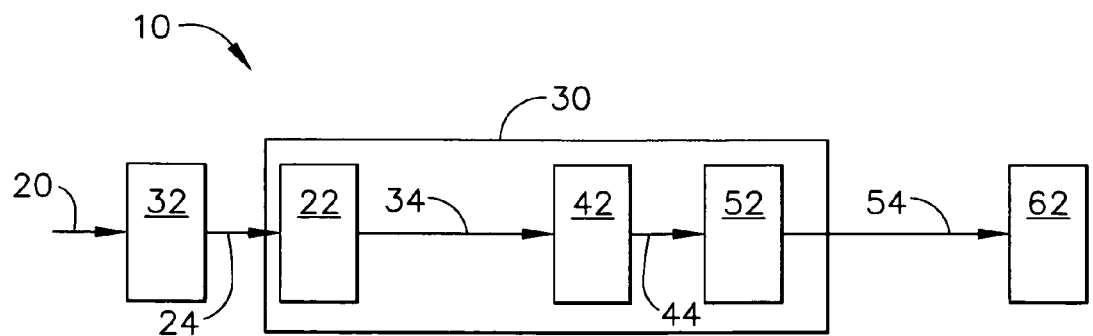
FIG. 3 is a block diagram of an apparatus for purifying breathing air using a carbon-based monolith structure, according to another embodiment of the present invention.

In FIG. 3, an apparatus 10 for purifying breathing air is shown. The apparatus 10 may comprise an environmental control system 30. Optionally, a fan 22 may be used to force air 20 into the environmental control system 30, producing a forced air. An engine 32 may be used instead of fan 22 to force the air 20 into the environmental control system 30 or the engine 32 may be used, in combination with the fan 22, to convert a forced air 24 into a compressed air 34 for feeding into an impregnated carbon-based monolith structure 42. The engine 32 may be a gas turbine engine. The carbon-based monolith structure 42 may purify a contaminated stream 20 that has been pressurized into forced air 24 by an engine 32 or compressor 22. In contrast, particulate beds are not desirable to purify pressurized streams because the pressure drop is unacceptable and thus particulate beds require a greater expenditure of energy and have the potential to attrit. However, it is believed that the purification performance may be enhanced at higher pressures. The carbon-based monolith structure 42 may purify a contaminated stream 20 that has been heated during the forcing of the air 24 by an engine 32 or compressor 22. In contrast, typical activated carbons are not used to purify heated streams because typical activated carbons are not physically stable at high temperatures or may even be flammable. However, the purification performance may be enhanced at higher temperatures. Therefore, there may be advantages in locating the carbon-based monolith structure 42 upstream of the air-conditioning system 52, rather than downstream as with typical activated carbon filters. The carbon-based monolith structure 42 may have been formed by impregnation with at least one material selected from the group consisting of copper species, silver species, zinc species, and molybdenum species and triethylenediamine. A purified air 44 may be conditioned for temperature, pressure, and humidity by performing a step 230 of forcing the purified air 44 into an air-conditioning system 52 to produce a conditioned air 54. Next, a step 240 may comprise forcing the conditioned air 54, now purified and conditioned, into a space 62. The space 62 may be occupied or unoccupied; interior or exterior. The space 62 may be a vehicle interior, such as an aircraft cabin or a military tank interior. The space may also be the interior of a building or any other confined space for which purified air is desirable.

Figure 4:
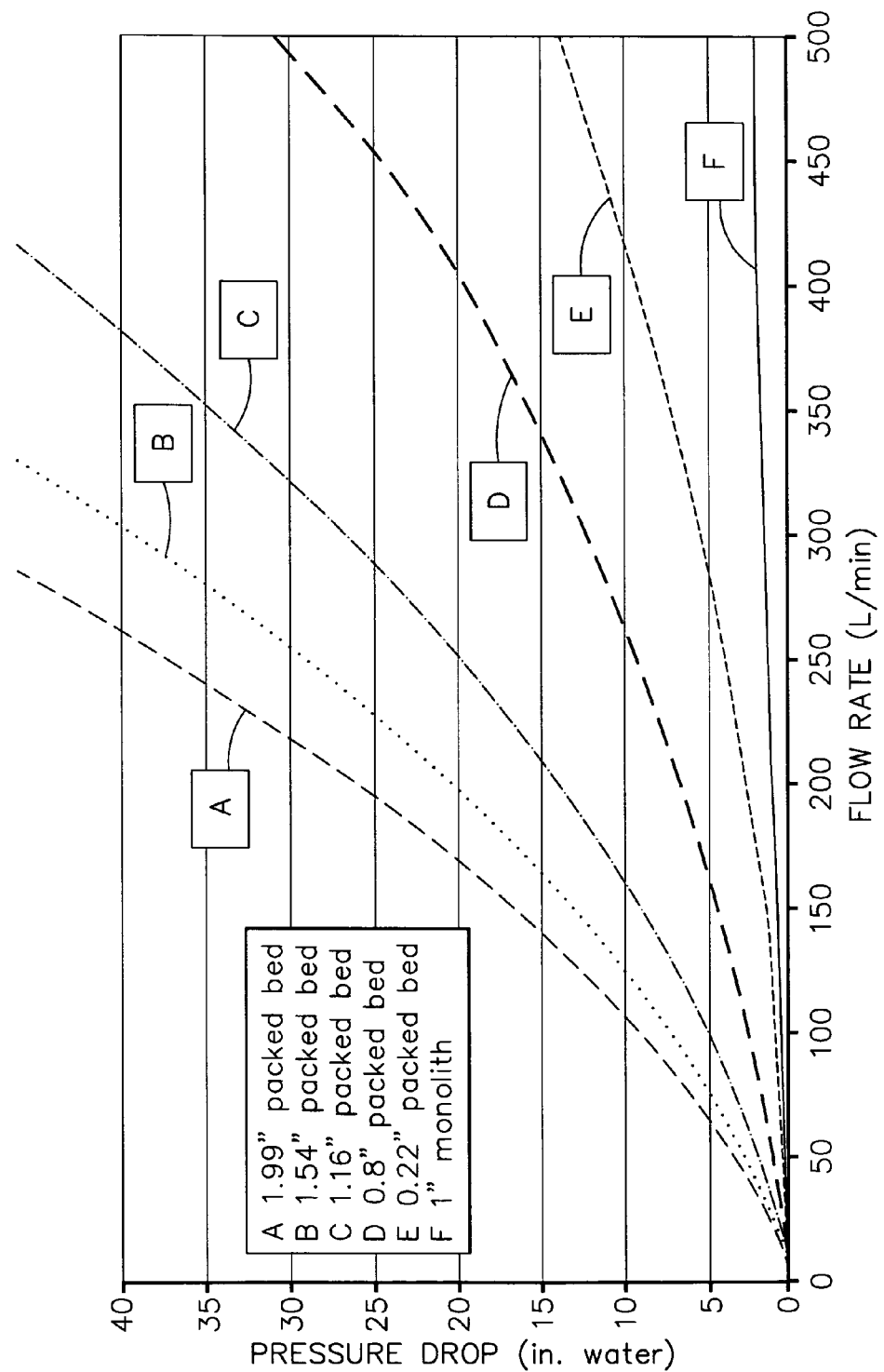
FIG. 4 is a graph of pressure drop in inches of water vs. flow rate in liters per minute for various packed beds and a monolith structure according to an embodiment of the present invention.

The graph in FIG. 4 may be used to illustrate how pressure drop across various packed beds, as used in prior art apparatus and methods, compares with pressure drop across a monolith structure of the present invention. The graph describes pressure drop in inches of water vs. flow rate in liters per minute.

In FIG. 4, Plot A represents a 1.99-inch (5.05 centimeters) packed bed. Plot B represents a 1.54-inch (3.91 centimeters) packed bed. Plot C represents a 1.16-inch (2.95 centimeters) packed bed. Plot D represents a 0.8-inch (2.03 centimeters) packed bed. Plot E represents a 0.22-inch (0.56 centimeters) packed bed. Plot F represents a 1-inch (2.54 centimeters) monolith structure. The packed beds used to collect this data (plots A-E) were 10×16 mesh packed beds. The adsorbent in the packed beds were activated carbon. The monolith structure used was a 550 cell per inch (2.54 centimeters) monolith structure prepared according to the present invention, e.g., as described for FIG. 1. As evidenced by the data in FIG. 3, a 1-inch (2.54 centimeters) monolith structure offers a lower pressure drop than even a 0.22-inch (0.56 centimeters) packed bed.

It should be understood, of course, that the foregoing relates to exemplary embodiments of the invention and that modifications may be made without departing from the spirit and scope of the invention as set forth in the following claims.

We claim:

1. A method for making a carbon-based monolith structure impregnated with copper, silver, zinc, and molybdenum species and triethylenediamine, wherein the monolith structure is impregnated by:
   contacting the monolith structure with a first solution;
   adjusting the pH of the first solution to about 2 to 5;
   treating thermally the monolith structure within a temperature range of from about 280 degrees C. to about 400 degrees C.;
   contacting the monolith structure with a second solution;
   adjusting the pH of the second solution to about 8 to 11;
   treating thermally the monolith structure within a temperature range of from about 100 degrees C. to about 400 degrees C.;
   reducing the monolith structure in hydrogen within a temperature range of from about 250 degrees C. to about 500 degrees C.; and
   exposing the monolith structure to triethylenediamine vapor within a temperature range of from about 80 degrees C. to about 200 degrees C.

2. The method of claim 1, wherein the step, of treating thermally the monolith structure and the first solution, occurs within a temperature range from about 300 degrees C. to about 325 degrees C.

3. The method of claim 1, wherein the step, of reducing the monolith structure in hydrogen, occurs at a temperature no higher than the temperatures used in the treating thermally steps.

4. The method of claim 1, wherein the step, of exposing the monolith structure to triethylenediamine vapor, occurs within a temperature range from about 80 degrees C. to about 100 degrees C.

5. The method of claim 1 further comprising contacting the monolith structure with a third solution.

6. The method of claim 5, wherein the third solution comprises zinc acetate at a concentration within a range of from about 0.25 M to about 1.0 M.

7. The method of claim 5, wherein the third solution comprises zinc acetate at a concentration within a range of from about 0.45 M to about 0.55 M.

8. The method of claim 1, wherein the exposing step is performed for a time within a range of from about 16 hours to about 30 hours.

9. The method of claim 8, wherein the exposing step is performed for a time within a range of from about 23 hours to about 25 hours.

10. The method of claim 1, wherein the first solution comprises ammonium heptamolybdate at a concentration within a range of from about 0.03 M to about 0.3 M.

11. The method of claim 10, wherein the first solution comprises ammonium heptamolybdate at a concentration within a range of from about 0.05 M to about 0.15 M.

12. The method of claim 1, wherein the second solution comprises a copper salt at a concentration within a range of from about 0.25 M to about 1.0 M.

13. The method of claim 12, wherein the second solution comprises copper salt at a concentration within a range of from about 0.45 M to about 0.55 M.

14. The method of claim 12, wherein the first solution comprises copper salt at a concentration within a range of from about 0.45 M to about 0.55 M.

15. The method of claim 1, wherein the second solution comprises a silver salt at a concentration within a range of from about 0.001 M to about 0.01 M.

16. The method of claim 1, wherein the second solution comprises silver salt at a concentration within a range of from about 0.002 M to about 0.005 M.

17. The method of claim 1, wherein each of the adjusting steps is followed by a step of removing the monolith structure from the solution.

18. The method of claim 1, wherein the treating thermally steps are performed within a nitrogen atmosphere.

19. The method of claim 1, wherein the step of contacting the monolith structure with the first solution is preceded by exposing the monolith structure to concentrated nitric acid, carbon dioxide, steam, or mixtures thereof.

20. A method for making a carbon-based monolith structure impregnated with copper, silver, zinc, and molybdenum species and triethylenediamine, wherein the monolith structure is impregnated by:
    contacting the monolith structure with a first solution;
    adjusting the pH of the first solution to about 8 to about 11;
    treating thermally the monolith structure within a temperature range of from about 100 degrees C. to about 400 degrees C.;
    contacting the monolith structure with a second solution;
    adjusting the pH of the second solution to about 2 to about 5;
    treating thermally the monolith structure within a temperature range of from about 280 degrees C. to about 400 degrees C.;
    reducing the monolith structure in hydrogen within a temperature range of from about 250 degrees C. to about 500 degrees C.; and
    exposing the monolith structure to triethylenediamine vapor within a temperature range of from about 80 degrees C. to about 200 degrees C.

21. The method of claim 20, wherein the step, of exposing the monolith structure to triethylenediamine vapor, occurs within a temperature range from about 80 degrees C. to about 100 degrees C.

22. The method of claim 20 further comprising contacting the monolith structure with a third solution.

23. The method of claim 22, wherein the third solution comprises zinc acetate at a concentration within a range of from about 0.25 M to about 1.0 M.

24. The method of claim 22, wherein the third solution comprises zinc acetate at a concentration within a range of from about 0.45 M to about 0.55 M.

25. The method of claim 20, wherein the exposing step is performed for a time within a range of from about 16 hours to about 30 hours.

26. The method of claim 25, wherein the exposing step is performed for a time within a range of from about 23 hours to about 25 hours.

27. The method of claim 20, wherein the second solution comprises ammonium heptamolybdate at a concentration within a range of from about 0.03 M to about 0.3 M.

28. The method of claim 27, wherein the second solution comprises ammonium heptamolybdate at a concentration within a range of from about 0.05 M to about 0.15 M.

29. The method of claim 20, wherein the first solution comprises a copper salt at a concentration within a range of from about 0.25 M to about 1.0 M.

30. The method of claim 20, wherein the first solution comprises a silver salt at a concentration within a range of from about 0.001 M to about 0.01 M.

31. The method of claim 20, wherein the first solution comprises silver salt at a concentration within a range of from about 0.002 M to about 0.005 M.

32. The method of claim 20, wherein each of the adjusting steps is followed by a step of removing the monolith structure from the solution.

33. The method of claim 20, wherein the treating thermally steps are performed within a nitrogen atmosphere.

* * * * *